United States Patent
Clerambourg et al.

(10) Patent No.: US 11,802,089 B2
(45) Date of Patent: Oct. 31, 2023

(54) METHOD FOR MANUFACTURING A PART MADE OF A COMPOSITE MATERIAL

(71) Applicant: SAFRAN CERAMICS, Le Haillan (FR)

(72) Inventors: Aurélia Clerambourg, Moissy-Cramayel (FR); Emilie Mendez, Moissy-Cramayel (FR); Eric Philippe, Moissy-Cramayel (FR); Denis Vicien, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 513 days.

(21) Appl. No.: 17/048,478

(22) PCT Filed: Apr. 4, 2019

(86) PCT No.: PCT/FR2019/050800
§ 371 (c)(1),
(2) Date: Oct. 16, 2020

(87) PCT Pub. No.: WO2019/202235
PCT Pub. Date: Oct. 24, 2019

(65) Prior Publication Data
US 2021/0163366 A1    Jun. 3, 2021

(30) Foreign Application Priority Data

Apr. 19, 2018 (FR) ........................ 1853435

(51) Int. Cl.
*C04B 35/565* (2006.01)
*C04B 35/628* (2006.01)
(Continued)

(52) U.S. Cl.
CPC .......... *C04B 35/565* (2013.01); *C04B 35/573* (2013.01); *C04B 35/584* (2013.01);
(Continued)

(58) Field of Classification Search
CPC .................................................. C04B 35/565
See application file for complete search history.

(56) References Cited

U.S. PATENT DOCUMENTS 5,840,221 A * 11/1998 Lau .................... C04B 35/62871
264/29.7
2004/0192534 A1    9/2004 Nixon et al.
(Continued)

OTHER PUBLICATIONS

International Search Report as issued in International Patent Application No. PCT/FR2019/050800, dated Jul. 5, 2019.

*Primary Examiner* — Robert A Vetere
(74) *Attorney, Agent, or Firm* — Pillsbury Winthrop Shaw Pittman LLP

(57) ABSTRACT

A process for manufacturing a ceramic matrix composite part, includes infiltrating a fibrous structure including a powder composition with a melt infiltration composition including at least silicon in order to form a ceramic matrix in the porosity of the fibrous structure, the powder composition including at least silicon carbide particles, wherein the silicon carbide particles have a bimodal size distribution with a first set of silicon carbide particles having a first average size and a second set of silicon carbide particles having a second average size smaller than the first average size, the number of particles in the first set being greater than the number of particles in the second set.

6 Claims, 2 Drawing Sheets

(51) Int. Cl.
  *C04B 35/657* (2006.01)
  *C04B 35/80* (2006.01)
  *F01D 25/00* (2006.01)
  *C04B 35/573* (2006.01)
  *C04B 35/584* (2006.01)

(52) U.S. Cl.
  CPC .. *C04B 35/62834* (2013.01); *C04B 35/62892* (2013.01); *C04B 35/657* (2013.01); *C04B 35/80* (2013.01); *F01D 25/00* (2013.01); C04B 2235/3826 (2013.01); C04B 2235/422 (2013.01); C04B 2235/428 (2013.01); C04B 2235/5244 (2013.01); C04B 2235/5256 (2013.01); C04B 2235/5436 (2013.01); C04B 2235/5445 (2013.01); C04B 2235/616 (2013.01); F05D 2230/20 (2013.01); F05D 2300/6033 (2013.01); F05D 2300/614 (2013.01)

(56) References Cited

U.S. PATENT DOCUMENTS

2017/0313627 A1    11/2017  Shim et al.
2018/0335099 A1*   11/2018  Bianco ................ F16D 65/126

\* cited by examiner

[Fig. 2]
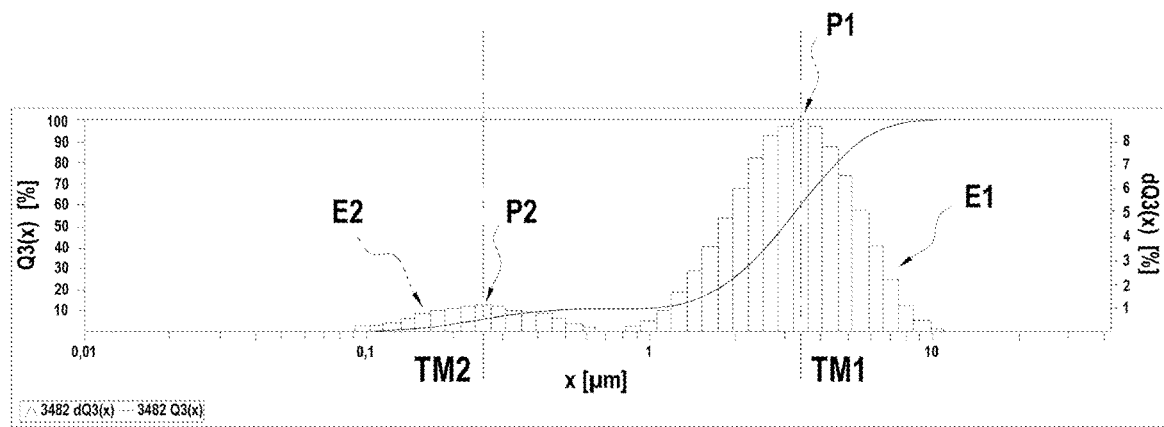
   
FIG.3A     FIG.3B     FIG.4A     FIG.4B
FIG.5
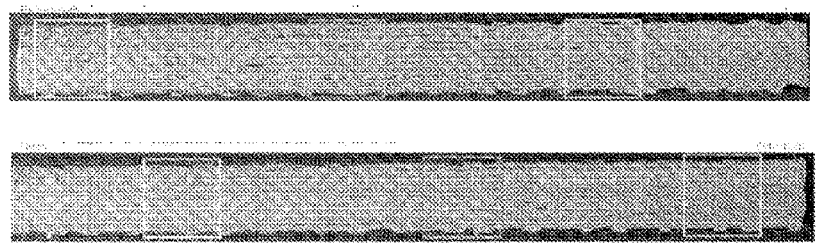

METHOD FOR MANUFACTURING A PART MADE OF A COMPOSITE MATERIAL

CROSS-REFERENCE TO RELATED APPLICATIONS

This application is the U.S. National Stage of PCT/FR2019/050800, filed Apr. 4, 2019, which in turn claims priority to French patent application number 1853435 filed Apr. 19, 2018. The content of these applications are incorporated herein by reference in their entireties.

The present invention relates to the manufacture of ceramic matrix composite (CMC) parts by melt infiltration technique.

BACKGROUND OF THE INVENTION

CMC parts can be formed by the melt infiltration technique. According to this technique, molten silicon can be introduced into the porosity of a fibrous structure comprising silicon carbide particles to form a ceramic matrix densifying the fibrous structure.

It is desirable in this technique that the molten silicon penetrates homogeneously and completely into the porosity of the fibrous structure, so that the resulting part has minimal residual porosity and therefore optimized mechanical properties.

However, some of the known melt infiltration techniques do not give fully satisfactory results as the degree of advance of the molten silicon into the porosity may be limited, leading to inhomogeneous penetration of the molten silicon into the fibrous structure.

This inhomogeneity may be even more pronounced in the context of reactive melt infiltration techniques where carbon particles are present in the fibrous structure. In the latter case, the reaction product between the molten silicon and the carbon particles can indeed lead to a local plugging of the preform porosity, making it more difficult for the molten silicon to advance.

SUBJECT MATTER AND SUMMARY OF THE INVENTION

The invention relates, according to a first aspect, to a process for manufacturing a ceramic matrix composite part, comprising at least:
infiltrating a fibrous structure comprising a powder composition with a melt infiltration composition comprising at least silicon in order to form a ceramic matrix in the porosity of the fibrous structure, the powder composition comprising at least silicon carbide particles, wherein the silicon carbide particles have a bimodal size distribution with a first set of silicon carbide particles having a first average size and a second set of silicon carbide particles having a second average size smaller than the first average size, the number of particles in the first set being greater than the number of particles in the second set.

"Average size" is defined as the dimension given by the statistical particle size distribution to half of the population, called D50.

The implementation of a bimodal distribution as defined above for the silicon carbide particles present in the porosity of the fibrous structure results in a porosity network facilitating the advancement of the infiltration composition within the fibrous structure. This results in a homogeneous densification of the fibrous structure and thus a CMC part with improved mechanical properties.

In an example embodiment, the particles of the first set represent at least 60% by number of the total silicon carbide particles in the powder composition.

In an example embodiment, the first average size is comprised between 1 µm and 5 µm.

In an example embodiment, the particles of the second set represent at most 40% by number of the total silicon carbide particles in the powder composition.

In an example embodiment, the second average size is comprised between 0.1 µm and 1 µm.

In an example embodiment, the particles of the first set represent between 60% and 90% by number of the total silicon carbide particles in the powder composition, and the particles of the second set represent between 10% and 40% by number of the total silicon carbide particles in the powder composition.

In an example embodiment, the powder composition also includes carbon particles.

The invention is particularly advantageous in the case where carbon is present in the powder composition because by facilitating the advance of molten silicon, it reduces the risk of local plugging encountered in known techniques.

Alternatively, the powder composition can be free of carbon particles.

In an example embodiment, the volume content of carbon particles in the powder composition is greater than or equal to 5%, for example 20%.

In an example embodiment, the fibrous structure may comprise silicon carbide yarns having an oxygen content of less than or equal to 1% in atomic percent.

In an example embodiment, the fibrous structure is formed by three-dimensional weaving or from a plurality of two-dimensional fibrous layers.

In an example embodiment, the fibrous structure is partially densified by a first phase of ceramic matrix before infiltration.

In an example embodiment, the manufactured part is a turbine engine part. The part can be a hot section part of a gas turbine of an aeronautical engine or an industrial turbine. In particular, the part can be at least part of a nozzle, a combustion chamber wall, a turbine ring sector or a turbine engine blade.

BRIEF DESCRIPTION OF THE DRAWINGS

Other features and advantages of the invention will become apparent in the following description, given on a non-limiting basis, in reference to the appended drawings provided on a non-limiting basis, in which:

FIG. 2 is an example of a bimodal size distribution of silicon carbide particles that can be used in the context of the invention, FIGS. 3A and 3B are photographs illustrating the capillary rise obtained when silicon carbide particles having a monomodal distribution are used, FIGS. 4A and 4B are photographs illustrating the capillary rise obtained when using silicon carbide particles having the bimodal size distribution of FIG. 2, and FIG. 5 is a photograph illustrating the capillary rise obtained in an example of the process according to the invention.

DETAILED DESCRIPTION OF EMBODIMENTS

Figure 1:
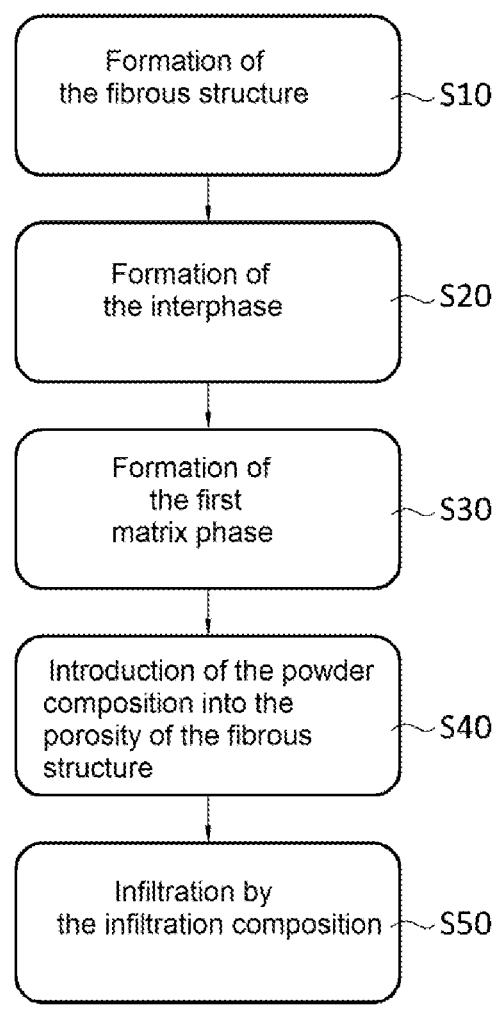
FIG. 1 is a flowchart illustrating a succession of steps of an example of the process according to the invention.

An example of a process for manufacturing a CMC part according to the invention will now be described in relation to the flowchart in FIG. 1.

A first step S10 of the process can consist of forming the fibrous structure, for example by three-dimensional weaving. The fibrous structure can be formed from ceramic yarns, for example silicon carbide yarns. The fibrous structure can form the fiber reinforcement of the composite part to be produced. The fibrous structure obtained in step S10 can form a fibrous preform of the part to be produced.

Examples of silicon carbide yarns that can be used are "Nicalon", "Hi-Nicalon" or "Hi-Nicalon-S" yarns marketed by the Japanese company NGS. The ceramic yarns of the fibrous structure can have an oxygen content of up to 1% in atomic percent. The "Hi-Nicalon-S" yarns, for example, have such a feature.

"Three-dimensional weaving" or "3D weaving" is a weaving method in which at least some of the warp yarns bind weft yarns over several weft layers. An inversion of the roles between warp and weft is possible in the present text and must be considered as covered also by the claims. The fibrous structure may for example have an interlock weave. The term "interlock weave" means a 3D weave in which each layer of warp yarns links several layers of weft yarns with all yarns of the same warp column having the same movement in the plane of the weave.

It is also possible to start from fibrous textures such as two-dimensional fabrics or unidirectional webs, and to obtain the fibrous structure by draping such fibrous textures on a form. These textures can also be bonded together, for example by sewing or implanting yarns to form the fibrous structure.

In a step S20, an embrittlement-release interphase by chemical vapor infiltration (CVI) can be formed on the yarns of the fibrous structure.

The thickness of the interphase can for example be between 10 nm and 1000 nm, and for example between 10 nm and 100 nm. After formation of the interphase, the fibrous structure remains porous, with only a minority of the initial accessible porosity being filled by the interphase.

The interphase can be monolayer or multilayer. The interphase may comprise at least one layer of pyrolytic carbon (PyC), boron nitride (BN), silicon-doped boron nitride (BN(Si), with silicon in a mass proportion comprised between 5% and 40%, the balance being boron nitride) or boron-doped carbon (BC, with boron in an atomic proportion comprised between 5% and 20%, the balance being carbon).

The interphase has here a function of embrittlement-release of the composite material which favors the deflection of possible cracks reaching the interphase after having propagated in the matrix, preventing or delaying the rupture of fibers by such cracks. Alternatively, it should be noted that it is possible to form the interphase on the yarns before the formation of the fibrous structure, i.e. before implementation of step S10.

Carried out next is a step S30 of forming a first phase of ceramic matrix in the porosity of the fibrous structure, on the interphase that may have been previously formed on the yarns. This first phase of matrix can be formed by chemical vapor infiltration. The first ceramic matrix phase may, for example, consist of SiC and/or $Si_3N_4$.

The residual porosity rate of the fibrous structure after this step S30 and before introduction of the powder composition can be higher than or equal to 25%, for example comprised between 30% and 35%. In general, the residual porosity rate of the fibrous structure after the step S30 is sufficient to allow the introduction of the powder composition into the porosity of the fibrous structure and the formation of a second matrix phase by introduction of the infiltration composition.

The powder composition can be introduced into the fibrous structure by slurry-cast (step S40). Such an introduction technique is known per se.

The powder composition comprises at least two sets of silicon carbide particles each having a different average size (size D50).

The silicon carbide particles of the set having the highest average size are more numerous than those of the set having the lowest average size.

In an example embodiment, the particles of the first set represent between 60% and 90% by number of the total silicon carbide particles in the powder composition, and the particles of the second set represent between 10% and 40% by number of the total silicon carbide particles in the powder composition.

In an example embodiment, the first average size is comprised between 1 μm and 5 μm, and the second average size is comprised between 0.1 μm and 1 μm.

The particle size distribution of the silicon carbide particles can be determined by laser diffraction technique in a manner known per se.

The silicon carbide particles have a bimodal size distribution in the powder composition. FIG. 2 shows an example of such a bimodal distribution that can be used in the invention. In this figure, for a given particle size x, the ordinate indicates the fraction of the particles having this size x. The size distribution may be a number distribution.

The silicon particles define a first set E1 of silicon carbide particles and a second set E2 of silicon carbide particles.

The bimodal distribution is asymmetric. The bimodal distribution has two distinct peaks (maxima) P1 and P2. The height of the peak P1 of the distribution of the first set E1 can be different, for example higher, than the height of the peak P2 of the distribution of the second set E2. In particular, the height of the peak P1 may be more than double or even triple the height of the peak P2.

The distribution of each of the first and second sets E1 and E2 may correspond to a normal distribution. The particles of the first set E1 have a first average size TM1 and the particles of the second set E2 have a second average size TM2. The first average size TM1 is larger than the second average size TM2. The second average size TM2 can be spaced from the first average size TM1 by at least two, or even at least three, standard deviations from the distribution of the first set E1. The difference between the first average size TM1 and the second average size TM2 (quantity TM1−TM2) may be greater than or equal to 1 μm, for example 2.5 μm.

By way of example of silicon carbide particles having a bimodal size distribution that can be used in the invention, mention may be made of the silicon carbide powder marketed under the name "B-hp" by the company H.C. Starck.

Once the powder composition has been introduced into the fibrous structure, for example by injection of a slip, the fibrous structure can be dried. A fibrous structure filled with the powder composition is then obtained. The powder composition is present in the porosity of the fibrous structure.

As mentioned above, the powder composition may also include carbon particles, for example in a volume content comprised between 5% and 30%. By way of example of carbon particles that can be used are the particles marketed under the name "LUVOMAXX® MT N-991" by Lehmann & Voss & Co. Alternatively, the powder composition can be free of carbon particles.

Once the powder composition is introduced, step S50 is performed during which the porosity of the fibrous structure is infiltrated with a melt infiltration composition comprising at least silicon so as to form a ceramic matrix in the porosity of the fibrous structure. The formation of this ceramic matrix can be used to finalize the densification of the part.

This infiltration step corresponds to a melt infiltration step. The infiltration composition can be pure molten silicon or alternatively be in the form of a molten alloy of silicon and one or more other constituents. The infiltration composition can comprise predominantly silicon by mass, i.e. have a silicon mass content greater than or equal to 50%. The infiltration composition can for example have a silicon mass content greater than or equal to 75%. The constituent(s) present in the silicon alloy can be selected from B, Al, Mo, Ti, and mixtures thereof. When the powder composition includes carbon particles, a chemical reaction may occur between the infiltration composition and these carbon particles during infiltration resulting in the formation of silicon carbide.

After step S50, a CMC part is obtained. Such a CMC part can be a static or rotating part of a turbine engine. Examples of turbine engine parts have been mentioned above. Such a part can also be coated with an environmental or thermal barrier coating before use.

An example in which the fibrous structure is pre-densified during step S30 before performing the melt infiltration is described in FIG. 1, but of course it is not beyond the scope of the invention when this is not the case. The entire matrix can be formed during the infiltration step by molten silicon.

FIGS. 3A, 3B, 4A and 4B show the result obtained after infiltration of a green body made of a mixture of silicon carbide and carbon powders with molten silicon.

FIGS. 3A and 3B show the results obtained when using a silicon carbide powder with a monomodal size distribution. Silicon carbide particles having such a size distribution cannot be used in the context of the invention.

FIGS. 4A and 4B show the results obtained when using a silicon carbide powder having the bimodal distribution of FIG. 2. These silicon carbide particles can be used in the context of the invention. In FIGS. 3A and 4A, there are in the green body 70% by volume of silicon carbide particles and 30% by volume of carbon particles. In FIGS. 3B and 4B, there are in the green body 80% by volume of silicon carbide particles and 20% by volume of carbon particles.

The inventors found that the capillary rise of molten silicon was incomplete when using silicon carbide particles with a monomodal size distribution (FIGS. 3A and 3B). On the other hand, the capillary rise of molten silicon was complete when using silicon carbide particles with a bimodal size distribution as described above (FIGS. 4A and 4B).

The photograph in FIG. 5 shows the result obtained after infiltration by molten silicon of a fibrous structure previously filled with a powder composition comprising 80% by volume of silicon carbide particles having the bimodal size distribution of FIG. 2, and 20% by volume of carbon particles. It can be seen that the molten silicon was able to impregnate the fibrous structure over its entire length and homogeneous densification was obtained.

In FIG. 5, the first half of the length of the densified fibrous structure is at the top, and the second half of the length of the densified fibrous structure is at the bottom. The obstruction phenomenon during infiltration is not evident and a homogeneous densification is obtained.

The expression "comprised between . . . and . . ." should be understood to include the bounds.

The invention claimed is:

1. A process for manufacturing a ceramic matrix composite part, comprising:
   infiltrating a fibrous structure comprising a powder composition with a melt infiltration composition comprising at least silicon in order to form a ceramic matrix in the porosity of the fibrous structure, the powder composition comprising at least silicon carbide particles,
   wherein the silicon carbide particles have a bimodal size distribution with a first set of silicon carbide particles having a first average size and a second set of silicon carbide particles having a second average size smaller than the first average size, the number of particles in the first set being greater than the number of particles in the second set,
   wherein the first average size is comprised between 1 μm and 5 μm,
   wherein the second average size is comprised between 0.1 μm and 1 μm, and
   wherein the particles of the first set represent between 60% and 90% by number of the total silicon carbide particles in the powder composition, and wherein the particles of the second set represent between 10% and 40% by number of the total silicon carbide particles in the powder composition.

2. The process as claimed in claim 1, wherein the powder composition further comprises carbon particles.

3. The process as claimed in claim 2, wherein the volume content of carbon particles in the powder composition is greater than or equal to 5%.

4. The process as claimed in claim 1, wherein the fibrous structure is formed by three-dimensional weaving or from a plurality of two-dimensional fibrous layers.

5. The process as claimed in claim 1, wherein the part is a turbine engine part, and wherein the fibrous structure is a fibrous preform of the turbine engine part.

6. The process as claimed in claim 1, wherein the powder composition further comprises carbon particles and wherein the volume content of carbon particles in the powder composition is greater than or equal to 20%.

* * * * *